Patented May 15, 1923.

1,454,959

UNITED STATES PATENT OFFICE.

HENRY DREYFUS, OF LONDON, ENGLAND.

CELLULOSE-ETHER COMPOSITION.

No Drawing. Application filed November 16, 1920. Serial No. 424,511.

*To all whom it may concern:*

Be it known that I, HENRY DREYFUS, a citizen of the Swiss Republic, residing at London, England, have invented certain new and useful Improvements in Cellulose-Ether Composition, of which the following is a specification.

This invention relates to the manufacture of solutions, films, artificial filaments, celluloid-like masses, electric insulating materials, varnishes, coating materials, or other compositions, preparations or articles made with aliphatic ethers of cellulose hereinafter referred to.

The invention is characterized by the employment as plasticising agents for the manufacture of compositions of matter made with cellulose ethers, in general, of certain hereinafter specified high boiling aromatic low carbon alkyl sulfonamide preparations which are liquids at ordinary temperature and become more viscous and gelatinous when cooled to low temperatures.

In addition to the volatile solvents or diluents which are generally used in making solutions or other products such as referred to, (all of which are hereinafter included in the term "compositions of matter") with cellulose derivatives or in some cases even without such volatile liquids, higher boiling solvents called plasticising agents are employed for the cellulose derivative or derivatives forming the basis of the solution, compositions or products.

In the specification of a previous U. S. Patent 1,353,384 dated 21 September, 1920, I have described the employment as high boiling plasticising solvents for cellulose acetate, of high boiling mixtures of isomeric xylene-low carbon alkyl sulphonamides, which mixtures are liquid at ordinary temperature, and are such as can be obtained by treating an ordinary commercial xylene, distilling for example at about 135° to 146° C., by the ordinary methods of conversion into the alkyl sulphonamides, for example by treating the crude xylene with chlorosulphonic acid to form the corresponding sulphochlorides, and then with ammonia to convert these into the sulphonamides, and then methylating same to the mono or dimethyl stage or ethylating to the monoethyl stage; or by treating the said mixed sulphochlorides with amines such as methylamine, ethylamine, etc.

In the specification of another U. S. Patent No. 1,353,385, dated 21 September, 1920, I have described the employment as high boiling plasticising solvents for cellulose acetate, of high boiling mixtures comprising o- and p-toluene low carbon alkyl sulphonamides, which mixtures are liquid at ordinary temperature, and are such as can be obtained on treating commercial toluene by ordinary methods of conversion into the alkyl sulphonamides, for example by treating the toluene with chlorosulphonic acid to form the corresponding sulphochlorides, treating the resulting raw mixture with ammonia to convert the sulphochlorides into sulphonamides and then methylating or ethylating to the monomethyl or monoethyl stage; or by treating the said raw mixture with amines such as methylamine, ethylamine, etc.

In my British Patent No. 154,334 and in the specification of another application for U. S. patent Serial No. 401,380 filed August 5, 1920, I have described the employment of certain other aromatic alkylated sulphonamide derivatives or preparations as high boiling solvents for cellulose acetate, namely:

Benzene monomethyl sulphonamide. This substance boils at about 180° C. under 1-2 mm. pressure, is liquid at ordinary temperature and forms a clear, soft jelly at —15° C.

Benzene methyl ethyl sulphonamide. Boils at about 170°–175° C. under 1-2 mm. pressure, is liquid at ordinary temperature and forms a soft turbid jelly at —25° C.

Mixtures of o- and p-toluene dimethyl sulphonamides. Such mixtures boil at about 133°–137° C. under 1 mm. pressure, are liquid at ordinary temperature, form slightly turbid jelly at —15° C. and a firm turbid jelly at —20° C.

Mixtures of o- and p-toulene methyl ethyl sulphonamides. Such mixtures boil at about 188°–189° C. under 1 mm., are liquid at ordinary temperature, form soft, clear jellies at —15° C. and form clear jellies at —20° C.

Mixtures of o- and p-toluene diethyl sulphonamides. Such mixtures boil at about 136°–142° C. under 1 mm., are liquid at ordinary temperature, form soft, clear jelly at —10° C. and a firm, clear mass at —20° C.

O-toluene dimethyl sulphonamide. This substance boils at about 148°–152° C. under 2 mm., is liquid at ordinary temperature, forms a soft, clear jelly at —10° C. and a firm, clear jelly at —20° C.

O-toluene diethyl sulphonamide. This substance boils at about 152–155° C. under 2 mm., is liquid at ordinary temperature, forms a soft, clear jelly at —5° C. and a firm, clear jelly at —20° C.

Mixtures of isomeric xylene diethyl sulphonamides. Such mixtures boil at about 148°–154° C. under 1 mm. pressure, are liquid at ordinary temperature, and form a soft, clear jelly at —5° C. and a firm, clear jelly at —20° C.

Mixtures of isomeric xylene methyl ethyl sulphonamides. Such mixtures boil at about 155°–156° C. under 1 mm., are liquid at ordinary temperature, form clear, soft jellies at —14° C. and slightly harder jellies at —20° C.

In preparing the said benzene methyl ethyl sulphonamide derivative, ordinary commercial benzene was used, for example an impure benzene distilling between 79°–88° C. (90% going over at about 78°–80° C.).

For preparing the said mixtures of o- and p-toluene alkyl sulphonamides ordinary commercial toluene was used, distilling between 95° and 132° C., and substantially pure toluene boiling at 110°–111° C. for the o-toluene dimethyl and o-toluene diethyl sulphonamide product, whilst for the mixtures of isomeric xylene dialkyl sulphonamides an ordinary commercial xylene was used distilling between 135° and 146° C. (about 78% between 135° and 139° C.).

The preparation however is not confined to working with these particular grades of the hydrocarbons. For example pure benzene may be used for the benzene methyl sulphonamide, or purer to pure toluene may be used for producing the mixtures of o- and p-toluene alkyl sulphonamides.

The procedure followed for preparing the alkyl sulphonamide products referred to may be according to the ordinary methods of preparing such alkylated compounds via the sulphochlorides, these either being treated with ammonia and then alkylated with the appropriate alkylating agent such as dimethyl sulfate or ethyl sulfuric acid salt or chlorethyl, etc., or being treated direct with amines, such as methylamine, ethylamine, etc.

In cases where the commercial or impure hydrocarbon is indicated above as having been used, the treatment was carried out thereon without separation or purification of the intermediate or final products. In the case of the o-toluene dimethyl and diethyl sulphonamides the mixture of o- and p-toluene sulfochlorides resulting from the treatment with chlorosulfonic acid was cooled in the ordinary way (at about —10° C.) and the crystallized p-sulfochloride was separated from the o-sulfochloride by filtration.

The preparation of the aromatic alkyl sulfonamides hereinbefore referred to, is not however, limited to the particular procedure indicated and any other methods giving substantially similar products may be employed.

All of the hereinbefore mentioned aromatic sulfonamide derivatives or preparations have high boiling points, are liquid at ordinary temperatures (below about 0° C.), becoming more viscous and gelatinous when cooled to low temperatures, and they are insoluble or very little soluble in water. They are all hereinafter included in the term "high boiling aromatic, low carbon alkyl sulfonamide preparations."

In the specification of my British Patent No. 164374 and of my application for U. S. patent, Serial No. 401381, filed August 5, 1920, I have described new ethyl, methyl, methyl-ethyl and other aliphatic ethers or "mixed" aliphatic ethers of cellulose and processes for the production of such ethers; such ethers, and especially the more highly alkylated ones can be applied or employed, for the manufacture of films, artificial filaments, celluloid-like masses, electric insulating materials, varnishes, coating materials or any other purposes for which cellulose esters or ethers have been proposed or used,—in combination or not with any known or suitable solvents, plasticising agents or other substances.

The said aliphatic ethers of cellulose can be obtained by treating cellulose or other like cellulosic body not soluble in alkali, with aliphatic etherifying agents, in presence of alkali, whilst restricting the water present, whether contained in or added to the cellulosic body before the etherification or added during the etherification (disregarding water formed in the reaction itself) to an amount not greater than from about the natural humidity content of the cellulosic body up to about four times the weight of the cellulosic body, and preferably not greater in amount that about one-half to one and a half times this weight, the total alkali used in the etherification process being at least equal in weight to, and preferably exceeding, in a ratio of from 3:1 to 19:1 or more, the weight of water present or added during the etherification (disregarding water which may be formed in the reaction itself), the total quantity of alkali required being introduced either all at once, or preferably interruptedly at different stages and the etherifying agent or agents being introduced either all at once, or preferably at different stages or continuously.

The present invention is characterized by the application or employment of any of the aforesaid high boiling aromatic low-carbon alkyl sulphonamide derivatives or preparations, which are liquid at ordinary temperatures and become more viscous and gelatinous at low temperatures (below about 0° C.) as high boiling solvents or plastic inducing agents for the said aliphatic ethers or "mixed" aliphatic ethers of cellulose referred to in my said British Patent No. 164374 and U. S. specification Serial No. 401,381, filed August 5, 1920, in the manufacture of solutions, films, artificial filaments, celluloid-like masses, electric insulating materials, varnishes, coating materials or other compositions, preparations or articles.

Any of the aforesaid alkylated sulphonamide derivatives or preparations may be employed, or any mixtures of two or more of them, in carrying out the invention.

Further it is to be understood that the invention includes the employment of the aliphatic or "mixed" aliphatic cellulose ethers of my British Patent No. 164374 (U. S. specification Serial No. 401381) or of mixtures thereof with any other ethers, esters or derivatives of cellulose, in conjunction with the said high boiling aromatic low-carbon alkyl sulphonamide preparations.

The said alkylated sulphonamide derivatives or preparations may be employed in any suitable proportions, variable according to the degree of hardness, softness or pliability desired in the ultimate product, or other circumstances.

They may be employed with or without solvents or liquids of lower or low boiling point, according to requirements.

Any known high boiling solvents or plastic inducing substances, such as triacetin and so forth, or even other aromatic sulphonamide derivatives previously proposed as plasticisers, may be added or used with the said alkylated sulphonamide derivatives or preparations. Likewise any other suitable or desired substances having particular effects may be used or added with them, such as triphenyl phosphate, tricresyl phosphate, castor oil, acid neutralizing aliphatic derivatives of urea which are liquid or have a low melting point, such as mono-, di- or tri-methyl- or mono- di- or tri-ethyl-urea, colouring matters, filling materials and any other materials suitable for the product to be made.

The following are some examples of the manner in which the invention may be carried out, it being understood that they are given only by way of illustration and may be varied within wide limits without departing from the invention. The parts are by weight.

A. *For making celluloid-like materials.*

To each 100 parts of ethyl cellulose made according to Example 1, 2, 3 or 4 of my said British specification No. 164374 for example, one may take about 25 parts of benzene monomethylsulphonamide, toluene-o-mono ethyl suphonamide, mixtures of isomeric xylene monomethyl or monoethyl sulphonamides, or others of the alkylated sulphonamide derivatives before referred to or mixtures thereof, as high boiling solvent or plasticiser, and about 12 parts of tricresylphosphate or triphenylphosphate, these substances being mixed together with low boiling solvents of the ethyl cellulose, for example alcohol-benzol or alcohol, the mass being worked in the ordinary way in the celluloid apparatus, first in the mixers, then on the rollers and afterwards in the presses, and so on, as generally practised in the celluloid industry. The above proportions will give relatively hard, incombustible or low flamable celluloid-like materials.

By reducing the quantity of the alkylated sulphonamide derivatives, together with the triphenylphosphate or tricresylphosphate, a still harder celluloid-like material may be obtained. On the other hand by increasing the quantity of the alkylated sulphonamide derivatives proportionately softer celluloid-like materials are obtained. For example if one takes to 100 parts of the ethyl cellulose 100 parts of the sulphonamide derivatives, materials may be obtained which are pliable like a fabric, and if less than 100 per cent of the sulphonamide derivatives are taken per 100 parts of the ethyl cellulose a proportionately stiffer celluloid-like material is obtained according to the reduction of the quantity of the sulphonamide derivatives, whilst if the quantity of these is increased above 100 per cent a still more pliable material is obtained.

B. *For films and varnishes.*

Ethyl cellulose made according to Example 1, 2, 3, or 4 of my said British specification 164374 (U. S. specification Ser. No. 401,381) for example, may be taken, in say as an 8 to 10 per cent solution in a low boiling solvent thereof such as alcohol-benzol or alcohol and about 10% of one or more of the said sulphonamide derivatives (calculated on the weight of the ethly cellulose) may be mixed with the solution as a high boiling solvent or plasticiser, with or without addition of triphenyl phosphate or tricresyl phosphate in a proportion of about 10% relatively to the quantity of the ethyl cellulose.

In the above examples one may take, instead of the ethyl cellulose, methyl cellulose made for instance according to Example 5 of my said British specification No. 164374, a suitable solvent of low boiling point being employed, such as alcohol-benzol.

As before mentioned any other aliphatic ethers of cellulose according to my said British specification No. 164374 (U. S.

specification S. No. 401,381) may be employed with the present invention.

What I claim and desire to secure by Letters Patent is:

1. A composition of matter containing a cellulose ether and a high boiling aromatic low-carbon alkyl sulfonamide preparation which is liquid at ordinary temperature and becomes more viscous and gelatinous when cooled to low temperatures.

2. A composition of matter containing ethyl cellulose and a high boiling aromatic low-carbon monoalkyl sulfonamide preparation which is liquid at ordinary temperature and becomes more viscous and gelatinous when cooled to low temperatures.

3. A composition of matter, containing an aliphatic ether of cellulose and a high boiling aromatic low-carbon alkyl sulphonamide preparation which is liquid at ordinary temperature and becomes more viscous and gelatinous at low temperatures.

4. A composition of matter comprising a mixed cellulose ether and a high boiling aromatic low-carbon alkyl sulfonamide preparation which is liquid at ordinary temperature and which becomes more viscous and gelatinous when cooled to low temperatures.

In testimony whereof I have hereunto subscribed my name.

HENRY DREYFUS.